United States Patent Office 2,852,481
Patented Sept. 16, 1958

2,852,481

AQUEOUS LATEX CONTAINING COPOLYMERS OF CHLOROPRENE OF 2,3-DICHLORO-1,3-BUTADIENE AND VINYL TOLUENE

Paul R. Johnson, Wilmington, Del., assignor to E. I. du Pont de Nemours and Company, Wilmington, Del., a corporation of Delaware No Drawing. Application March 7, 1955
Serial No. 492,779

3 Claims. (Cl. 260—29.7)

This invention relates to copolymers particularly suitable as a base for finishes for leather, and more particularly to heteropolymers of chloroprene, 2,3-dichloro-1,3-butadiene and vinyl toluene.

The modern finishes for grain leather must have a combination of properties, some of which are ordinarily inconsistent with each other. They must be relatively hard and free from tack, yet they must be flexible (non-cracking) and exhibit good adhesion to leather. While certain polymer preparations currently sold for use in finishing leather fulfill part of these requirements, they are not entirely satisfactory, and other resins which have been suggested for this purpose are too costly.

It is an object of the present invention to provide a heteropolymer of chloroprene in latex form which exhibits desirable properties as a base for finishes for leather. A further object of the invention is to provide a base for leather finishes which penetrates and adheres well to the leather, gives a smooth finish with little drag, and does not adhere to the plates during the finishing operation.

The improved base for leather finishes of the present invention is a copolymer prepared from 30 to 50 parts of chloroprene, 5 to 15 parts of 2,3-dichloro-1,3-butadiene and from 40 to 60 parts of vinyl toluene, in which the polymerization is carried out in the presence of from 0.25 to 1 part of a long chain alkyl mercaptan as a modifying agent. The polymerization is preferably carried out in an aqueous alkaline medium to form a latex with which the pigment paste normally used in the finishing of leather can be incorporated. The preferred composition for use with the usual pigment pastes will comprise from 40 to 50 parts of chloroprene, 5 to 10 parts of 2,3-dichloro-1,3-butadiene and from 40 to 50 parts of vinyl toluene containing from 0.5 to 0.75 part of the long chain alkyl mercaptan as a modifying agent.

The long chain alkyl mercaptan used as the chain-transfer or modifying agent may contain from about 8 to about 20 carbon atoms and may be primary, secondary or tertiary, straight or branched, although the straight chain primary alkyl mercaptans are usually preferred.

In this application the term vinyl toluene is used to mean ortho, meta, or paravinyl toluene and mixtures thereof, such as mixtures commercially available and sold under the generic name of vinyl toluene.

As illustrated in the following examples, the copolymers of this invention is preferably prepared by mixing the monomeric ingredients and subjecting them to moderate polymerization conditions until all of the chloroprene and the 2,3-dichloro-1,3-butadiene has polymerized, and then under more vigorous polymerization conditions forcing the polymerization of the remaining vinyl toluene.

In preparing the monomer dispersion, any anionic dispersing agent which has been found suitable for use in emulsion polymerization of butadiene compounds may be employed. Likewise, any of the catalysts (polymerization initiators) systems used for diene polymerization may be employed. After polymerization the latex may be further stabilized against coagulation by the addition of any of the surface-active agents ordinarily used for this purpose and may be stabilized against oxidation by the usual antioxidants employed in butadiene elastomers. The usual compounding ingredients such as resins, fillers, pigments and dyes may be incorporated in the latex of this invention in the usual manner.

The following examples are given to more fully illustrate the invention, it being understood that these are illustrative of the invention and are not to be construed as limitations thereof.

*Example 1*

An emulsion was made by dispersing, with high speed agitation, 40 parts by weight of chloroprene, 10 parts of 2,3-dichloro-1,3-butadiene and 50 parts of vinyl toluene (a mixture of 60% meta and 40% para isomers) containing 0.65 part of dodecyl mercaptan, in 127 parts of water containing 4 parts of disproportionated rosin neutralized with an excess (1.15 parts) of potassium hydroxide, and 3.56 parts of the sodium salt of the sulfuric acid monoester of a normally occurring mixture of higher fatty alcohols, chiefly lauryl and myristyl. The resulting emulsion was heated to 40° C. and a catalyst solution, made by dissolving 0.04 part of potassium persulfate and 0.004 part of 2-anthraquinone sodium sulfonate in 1.29 parts of water, was added stepwise over a period of about two hours, during which the specific gravity of the dispersion rose to 1.025, indicating complete polymerization of the chloroprene and dichlorobutadiene and the polymerization of part of the vinyl toluene. It is believed that the polymeric product formed up to this point is essentially an interpolymer of all three monomers. The temperature was then raised to 75° and the remaining vinyl toluene was polymerized by adding, over a period of about four hours, (1) 0.725 part of potassium persulfate in 11.7 parts of water, (2) 1.08 parts of 30% aqueous hydrogen peroxide, and (3) 0.834 part of 28% aqueous ammonia. Each was added in several portions so that the polymerization was continued at a fairly uniform rate. In other words, part of each solution was added in succession at the beginning and an additional part of each was added in the same way when the polymerization caused by the earlier additions had begun to slow down, as determined from periodic determinations of the density of the dispersion. When the density of the dispersion, measured at 70°, reached 1.033, indicating substantially complete polymerization, the latex was cooled to 25° and treated with one part of 2,6-ditertiarybutyl-4-methylphenol dissolved in 1.4 parts of xylene and dispersed in 1.09 parts of water containing 0.11 part of the same long chain sulfate dispersing agent used for making the monomer dispersion above and 0.037 part of a mixture of the sodium salts of the condensation product of formaldehyde and naphthalene sulfonic acid. The latex was then brought to a pH of 10.5 by adding potassium hydroxide solution and further stabilized by adding 3.75 parts of an alkylaryl polyether alcohol non-ionic dispersing agent (sold by Rohm & Haas Co. as "Triton" X–100). The total solids content was 39.8%.

To evaluate this latex as a base for a leather finish, it was diluted to 36% solids content and 40 parts of this was mixed with 18 parts of water, 2 parts of 28% ammonia and 40 parts of a pigment paste constituting of:

| | Parts |
|---|---|
| Iron oxide | 25 |
| Casein, 12% solution in aqueous ammonia | 25 |
| Methyl cellulose, 2% solution in water (15 centipoises) | 10 |
| Sulfonated castor oil | 5 |
| "Collatone," a preservative for casein (50% solution) | 0.4 |
| Water | 34.6 |

This finish was then applied in two coats, by brushing, on split leather. After drying, the coated leather was pressed between smooth plates heated to 160° F. The plate did not stick to the resulting finish, which penetrated and adhered well to the leather, was smooth and had little "surface drag" and in each of these respects was superior to a finish base currently employed in industry. It was hard and durable but also flexible and exhibited no tendency to crack.

Polymers with other compositions coming within the scope of this application were made and tested as described in Example 1 (exception in Example 2, noted below). All exhibit properties very similar to those given in Example 1. The composition, in parts, were as follows:

| Example No. | Chloroprene | Dichlorobutadiene | Vinyl toluene [2] | Dodecyl mercaptan |
|---|---|---|---|---|
| 2 [1] | 45 | 5 | 50 | 0.5 |
| 3 | 50 | 5 | 45 | 0.5 |
| 4 | 50 | 10 | 40 | 0.5 |
| 5 | 40 | 10 | 50 | 0.5 |
| 6 | 50 | 5 | 45 | 0.75 |
| 7 | 50 | 10 | 40 | 0.75 |
| 8 | 40 | 10 | 50 | 0.75 |

[1] Sodium used in place of potassium hydroxide.
[2] Commercial mixture employed in Example 1.

While the preferred proportions of the ingredients are those given above, the invention is not limited to these specific proportions but may include from 30 to 50 parts of chloroprene, 5 to 15 parts of 2,3-dichloro-1,3-butadiene and from 40 to 60 parts of vinyl toluene. From 0.25 to 1 part of the long chain alkyl mercaptan may be employed as the modifying agent.

I claim:
1. An aqueous alkaline latex of a copolymer adapted for use as a base for finishes for leather prepared by emulsion copolymerization of from 30 to 50 parts of chloroprene, 5 to 15 parts of 2,3-dichloro-1,3-butadiene and from 40 to 60 parts of vinyl toluene, in the presence of from 0.25 to 1 part of a long chain alkyl mercaptan.

2. An aqueous alkaline latex of a copolymer adapted for use as a base for finishes for leather prepared by emulsion copolymerization of 40 parts of chloroprene, 10 parts of 2,3-dichloro-1,3-butadiene and 50 parts of vinyl toluene, in the presence of 0.65 part of dodecyl mercaptan.

3. An aqueous alkaline latex of a copolymer adapted for use as a base for finishes for leather prepared by emulsion copolymerization of from 40 to 50 parts of chloroprene, 5 to 10 parts of 2,3-dichloro-1,3-butadiene and from 40 to 50 parts of vinyl toluene, in the presence of from 0.5 to 0.75 part of a long chain alkyl mercaptan.

References Cited in the file of this patent

UNITED STATES PATENTS

| | | |
|---|---|---|
| 2,538,273 | Rhines | Jan. 16, 1951 |
| 2,689,235 | Henson et al. | Sept. 14, 1954 |
| 2,702,284 | Brock | Feb. 15, 1955 |

FOREIGN PATENTS

| | | |
|---|---|---|
| 62,919 | Netherlands | Apr. 15, 1949 |